(12) United States Patent
Zhang et al.

(10) Patent No.: US 11,811,654 B2
(45) Date of Patent: Nov. 7, 2023

(54) PACKET PROCESSING METHOD AND APPARATUS

(71) Applicant: Huawei Technologies Co., Ltd., Shenzhen (CN)

(72) Inventors: Yongkang Zhang, Nanjing (CN); Kuili Zheng, Nanjing (CN); Bosen Chu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/690,874

(22) Filed: Mar. 9, 2022

(65) Prior Publication Data

US 2022/0200904 A1    Jun. 23, 2022

Related U.S. Application Data

(63) Continuation of application No. PCT/CN2020/105244, filed on Jul. 28, 2020.

(30) Foreign Application Priority Data

Sep. 10, 2019  (CN) .......................... 201910853670.0

(51) Int. Cl.
*H04L 45/00*     (2022.01)
*H04L 67/568*    (2022.01)
(Continued)

(52) U.S. Cl.
CPC ........ *H04L 45/566* (2013.01); *H04L 12/4633* (2013.01); *H04L 45/42* (2013.01); *H04L 45/745* (2013.01); *H04L 67/568* (2022.05)

(58) Field of Classification Search
CPC ....... H04L 45/42; H04L 45/56; H04L 45/563; H04L 45/566; H04L 45/745;
(Continued)

(56) References Cited

U.S. PATENT DOCUMENTS 10,122,622 B2    11/2018  Wang et al.
10,263,887 B2     4/2019  Patil et al.
(Continued)

FOREIGN PATENT DOCUMENTS

CN    103688509 A    3/2014
CN    104283891 A    1/2015
(Continued)

OTHER PUBLICATIONS

C. Filsfils et al., "Segment Routing Architecture," RFC: 8402, total 32 pages (Jul. 2018).
(Continued)

*Primary Examiner* — Clayton R Williams
(74) *Attorney, Agent, or Firm* — Leydig, Voit & Mayer, Ltd.

(57) ABSTRACT

A packet processing method and apparatus, related to the communication field are provided. The method includes: re-encapsulating a first packet from a first device to obtain a second packet, where the first packet includes first identification information and first service function chain (SFC) header encapsulation information, the second packet includes first index information and the first identification information and does not include the first SFC header encapsulation information, and the first index information is associated with the first SFC header encapsulation information and the first identification information; and sending the second packet to the second device based on the first SFC header encapsulation information. This can avoid impact on packet transmission after the second device modifies the identification information.

20 Claims, 9 Drawing Sheets

(51) Int. Cl.
  *H04L 12/46*  (2006.01)
  *H04L 45/42*  (2022.01)
  *H04L 45/745*  (2022.01)

(58) Field of Classification Search
  CPC ....... H04L 67/561; H04L 67/563–5651; H04L 67/568–5683; H04L 12/4633
  See application file for complete search history.

(56) References Cited

U.S. PATENT DOCUMENTS

| | | | |
|---|---|---|---|
| 2016/0352629 A1* | 12/2016 | Wang | ............... H04L 45/38 |
| 2017/0134538 A1 | 5/2017 | Mahkonen et al. | |
| 2017/0244631 A1* | 8/2017 | Guichard | ............... H04L 45/74 |
| 2017/0279938 A1 | 9/2017 | You et al. | |
| 2017/0331741 A1 | 11/2017 | Fedyk et al. | |
| 2018/0198705 A1 | 7/2018 | Wang et al. | |
| 2018/0295053 A1 | 10/2018 | Leung et al. | |
| 2019/0068470 A1* | 2/2019 | Mirsky | ............... H04L 41/5009 |
| 2019/0230005 A1* | 7/2019 | Ao | ............... H04L 61/30 |
| 2019/0306051 A1* | 10/2019 | Seetharaman | ............... H04L 45/22 |

FOREIGN PATENT DOCUMENTS

| | | |
|---|---|---|
| CN | 104980374 A | 10/2015 |
| CN | 106330714 A | 1/2017 |
| CN | 106559333 A | 4/2017 |
| CN | 107409089 A | 11/2017 |
| CN | 109952746 A | 6/2019 |
| CN | 107078950 B | 6/2020 |
| EP | 3319278 A1 | 5/2018 |
| JP | 2017147601 A | 8/2017 |
| JP | 2022-511028 | 4/2023 |
| KR | 20170000787 A | 1/2017 |
| WO | 2018166325 A1 | 9/2018 |

OTHER PUBLICATIONS

C. Filsfils et al., "Segment Routing Policy Architecture; draft-ietf-spring-segment-routing-policy-02.txt," SPRING Working Group, total 33 pages (Oct. 22, 2018).

C. Filsfils et al., "SRv6 Network Programming, draft-filsfils-spring-srv6-network-programming-05," total 53 pages (Jul. 2, 2018).

J. Halpern et al., "Service Function Chaining (SFC) Architecture," RFC 7665, total 32 pages (Oct. 2015).

P. Quinn et al., "Network Service Header (NSH)," RFC: 8300, total 40 pages (Jan. 2018).

F. Clad et al., "Service Programming with Segment Routing; draft-xuclad-spring-sr-service-programming-00," SPRING, Internet-Draft, total 30 pages (Jul. 2, 2018).

"Internet Protocol Darpa Internet Program Protocol Specification," RFC: 791, Marina del Rey, California, total 51 pages (dated Sep. 1981).

B. Fenner et al., "Experimental Values In IPv4, IPv6, ICMPv4, ICMPv6, UDP, and TCP Headers," RFC: 4727, total 11 pages (Nov. 2006).

M. Mahalingam et al., "Virtual eXtensible Local Area Network (VXLAN): A Framework for Overlaying Virtualized Layer 2 Networks over Layer 3 Networks," RFC: 7348, Independent Submission, Category: Informational, ISSN: 2070-1721, total 22 pages (Aug. 2014).

T. Narten, "Assigning Experimental and Testing Numbers Considered Useful," RFC: 3692, total 7 pages (Jan. 2004).

Iana, "Internet Protocol Version 4 (IPv4) Parameters," https://www.iana.org/assignments/ip-parameters/ip-parameters.xhtml#ip-parameters-1, total 4 pages (May 3, 2018).

C. Perkins, "IP Encapsulation within IP," Network Working Group, RFC: 2003, Category: Standards Track, total 14 pages (Oct. 1996).

A. Conta, "Generic Packet Tunneling in IPv6 Specification," Network Working Group, RFC: 2473, Category: Standards Track, total 36 pages (Dec. 1998).

D. Farinacci "Generic Routing Encapsulation (GRE)," Network Working Group, RFC: 2784, Category: Standards Track, total 9 pages (Mar. 2000).

* cited by examiner

| Option type | Option length | Sub-option type | Sub-option data | S field | R field | Slot number |
|---|---|---|---|---|---|---|
| Cache index ||||||||

FIG. 4

PACKET PROCESSING METHOD AND APPARATUS

CROSS-REFERENCE TO RELATED APPLICATIONS

This application is a continuation of International Application No. PCT/CN2020/105244, filed on Jul. 28, 2020, which claims priority to Chinese Patent Application No. 201910853670.0, filed on Sep. 10, 2019. The disclosures of the aforementioned applications are hereby incorporated by reference in their entireties.

TECHNICAL FIELD

Embodiments of this application relate to the communication field, and in particular, to a packet processing method and apparatus.

BACKGROUND

Currently, a working procedure of a service function forwarder proxy (SFF Proxy) in a conventional technology is as follows: The SFF proxy removes a service function chain (SFC) header from a received packet, re-encapsulates the packet into a packet that can be transmitted between the SFF proxy and a service function (SF) device, and records a correspondence between the SFC header and identification information that can identify the packet, for example, the identification information may be a 5-tuple of the packet.

Then, the SFF proxy sends the re-encapsulated packet to the SF. The SFF proxy continues to encapsulate the packet returned by the SF again. Specifically, the SFF proxy searches for a corresponding SFC header based on the 5-tuple of the packet, re-encapsulates a found SFC header into the packet, and sends the packet to a next-hop device.

However, if the SF updates the 5-tuple (for example, the SF updates a destination address in the 5-tuple), the SFC proxy cannot find the original SFC header. This interrupts packet transmission.

SUMMARY

This application provides a packet processing method, apparatus, and system, to avoid impact on packet transmission after an SF updates information used to associate an SFC packet header.

To achieve the foregoing, this application uses the following technical solutions.

According to a first aspect, an embodiment of this application provides a packet processing method, where the method may be applied to a first SFF proxy. The method may include: The first SFF proxy re-encapsulates a first packet from a first device to obtain a second packet, where the first packet includes first identification information and first service function chain (SFC) header encapsulation information, the second packet includes first index information and the first identification information and does not include the first SFC header encapsulation information, and the first index information is associated with the first SFC header encapsulation information and the first identification information; and then sends the second packet to the second device based on the first SFC header encapsulation information.

In the foregoing manner, packet transmission in a service chain is uninterrupted. This can avoid impact on the packet transmission in the service chain when an SF performs a function similar to network address translation, and therefore can effectively improve a success rate of the packet transmission.

In a possible implementation, the first index information may be further used to indicate that the first index information is generated by the first SFF proxy.

In the foregoing manner, in a communication system including a plurality of SFF proxies, an SFF proxy that receives the packet may determine, based on the first index information, whether the index information is generated by the SFF proxy. This manner is a packet processing manner applicable to a scenario with the plurality of SFF proxies.

In a possible implementation, the first index information includes first indication information and second indication information, where the first indication information is used to indicate that the first index information is generated by the first SFF proxy, and the second indication information is used to associate the first SFC header encapsulation information with the first identification information.

In the foregoing manner, in the communication system including the plurality of SFF proxies, the SFF proxy that receives the packet may determine, based on the first indication information, whether the index information is generated by the SFF proxy, and may find, based on the second indication information, the first SFC header encapsulation information and the first identification information that are associated with the second indication information. This manner is the packet processing manner applicable to the scenario with the plurality of SFF proxies.

In a possible implementation, the method may further include: The first SFF proxy receives a third packet, where the third packet includes second index information and second identification information. In an example, if the second index information includes the first indication information and the second indication information, the first SFF proxy may determine that the second index information is generated by the first SFF proxy, and search for, based on the second indication information, the first SFC header encapsulation information associated with the second indication information. Then, the first SFF proxy may re-encapsulate the third packet based on the first SFC header encapsulation information, to obtain a fourth packet, where the fourth packet includes the first SFC header encapsulation information and does not include the first index information.

In the foregoing manner, when the first SFF proxy receives the packet and determines, based on the first indication information, that the index information in the packet is generated by the first SFF proxy, the first SFF proxy may determine to locally cache associated data that is associated with the index information. The first SFF proxy may further obtain, based on the second indication information, the first SFC header encapsulation information associated with the second indication information, and re-encapsulate the packet based on the obtained SFC header encapsulation information.

In a possible implementation, in an example, the third packet may be from the second device. In another example, the third packet is a packet that is from the second device and that is forwarded by a second SFF proxy to the first SFF proxy.

In other words, in this application, the second packet sent by the first SFF proxy to the second device is processed by the second device to obtain the third packet, and the third packet may be returned to the first SFF proxy, or may be sent to the second SFF proxy. In addition, if the second SFF proxy cannot process the packet, the second SFF proxy forwards the packet to the first SFF proxy for processing.

In a possible implementation, before that a third packet is received, the method may further include: The first SFF proxy receives and caches third index information from the second SFF proxy, and third identification information and third SFC header encapsulation information that are associated with the third index information; and if the second index information included in the third packet is the same as the third index information, the first SFF proxy obtains the third SFC header encapsulation information associated with the third index information, and re-encapsulates the third packet based on the third SFC header encapsulation information.

In the foregoing manner, the first SFF proxy may pre-cache the third index information generated by the second SFF proxy and associated data that is associated with the third index information, so that when receiving the packet including the third index information, the first SFF proxy may re-encapsulate the packet based on pre-received associated data.

In a possible implementation, the method may further include: If it is determined, based on the second index information, that the second index information is not generated by the first SFF proxy, and no other information associated with the second index information is cached, sending the third packet to the second SFF proxy.

In the foregoing manner, when the first SFF proxy determines that the index information in the packet is not generated by the first SFF proxy and pre-shared associated data is not locally cached, the first SFF proxy may send the packet to the second SFF proxy for processing. This can ensure service chain processing continuity.

In a possible implementation, the second identification information is the same as or different from the first identification information.

In the foregoing manner, the packet processing method in this application may be applied to a packet processing process between the SFF proxy and the SF, where the SF may be a device that implements the function similar to the NAT. In other words, processing the second packet includes but is not limited to: changing a first identifier. The SF may alternatively be any SF in the conventional technology.

In a possible implementation, the method may further include: The first SFF proxy sends, to the second SFF proxy, the first index information, and the first identification information and the first SFC header encapsulation information that are associated with the first index information.

In the foregoing manner, the first SFF proxy may send, to the second SFF proxy, the first index information generated by the first SFF proxy and associated data that is associated with the first index information, so that when receiving the packet including the first index information, the second SFF proxy may encapsulate the packet based on the associated data without a need to forward the packet to the first SFF proxy. This can reduce network pressure.

In a possible implementation, the first identification information is used to identify a service flow to which the first packet belongs.

In the foregoing manner, the first SFF proxy may perform the packet processing manner in the foregoing method on all service flows to which the first packet belongs.

In a possible implementation, the service flow is an IP protocol service flow.

In a possible implementation, the SFC header encapsulation information is used to indicate a transmission path of the service flow.

In a possible implementation, the first identification information is carried in an extension field of the second packet.

In the foregoing manner, the index information may be carried in the extension field, and the field is not misread by the SF.

In a possible implementation, if the first packet is an IP protocol packet, the extension field is an option field in the first packet.

According to a second aspect, an embodiment of this application provides a packet processing system, where the system includes a first SFF proxy, a first device, and a second device. The first SFF proxy is configured to re-encapsulate a first packet from the first device to obtain a second packet, where the first packet includes first identification information and first service function chain SFC header encapsulation information, the second packet includes first index information and the first identification information and does not include the first SFC header encapsulation information, and the first index information is associated with the first SFC header encapsulation information and the first identification information. The first SFF proxy is further configured to send the second packet to the second device based on the first SFC header encapsulation information.

In a possible implementation, the second device is configured to process the second packet to obtain a third packet, where the third packet includes the first index information and second identification information, and the second identification information is the same as or different from the first identification information; and sends the third packet to the first SFF proxy. The first SFF proxy is further configured to re-encapsulate the third packet from the second device to obtain a fourth packet, where the third packet includes the second identification information and the first index information, and the fourth packet includes the second identification information and the first SFC header encapsulation information and does not include the first index information.

In a possible implementation, the first index information is further used to indicate that the first index information is generated by the first SFF proxy.

In a possible implementation, the system further includes a second SFF proxy. The second device is configured to process the second packet to obtain the third packet, where the third packet includes the first index information and the second identification information, and the second identification information is the same as or different from the first identification information; and send the third packet to the first SFF proxy or the second SFF proxy.

In a possible implementation, the first SFF proxy is further configured to send, to the second SFF proxy, the first index information, and the first identification information and the first SFC header encapsulation information that are associated with the first index information. The second SFF proxy is further configured to receive and cache the first index information, the first identification information, and the first SFC header encapsulation information.

In a possible implementation, if the second device sends the third packet to the second SFF proxy, the second SFF proxy is further configured to determine, based on the first index information, that the first index information is generated by the first SFF proxy, detect that the first SFC header encapsulation information associated with the first index information is locally cached, and re-encapsulate the third packet based on the first SFC header encapsulation information, to obtain the fourth packet.

In a possible implementation, if the second device sends the third packet to the second SFF proxy, the second SFF proxy is further configured to determine, based on the first index information, that the first index information is generated by the first SFF proxy, detect that no other information associated with the first index information is locally cached, and send the third packet to the first SFF proxy.

In a possible implementation, the first SFF proxy is further configured to receive the third packet from the second device or the second SFF proxy; determine, based on the first index information, that the first index information is generated by the first SFF proxy; obtain the first SFC header encapsulation information associated with the first index information; and re-encapsulate the third packet to obtain the fourth packet, where the fourth packet includes the second identification information and the first SFC header encapsulation information and does not include the first index information.

According to a third aspect, an embodiment of this application provides a packet processing apparatus applied to a first SFF proxy. The apparatus includes: a memory and a processor, where the memory is coupled to the processor. The memory includes program instructions, and when the program instructions are run by the processor, the apparatus is enabled to perform the following steps: re-encapsulating a first packet from a first service function SF device to obtain a second packet, where the first packet includes first identification information and first service function chain SFC header encapsulation information, the second packet includes first index information and the first identification information and does not include the first SFC header encapsulation information, and the first index information is associated with the first SFC header encapsulation information and the first identification information; and sending the second packet to a second device based on the first SFC header encapsulation information.

In a possible implementation, the first index information is further used to indicate that the first index information is generated by the first SFF proxy.

In a possible implementation, the first index information includes first indication information and second indication information, where the first indication information is used to indicate that the first index information is generated by the first SFF proxy, and the second indication information is used to associate the first SFC header encapsulation information with the first identification information.

In a possible implementation, when the program instructions are run by the processor, the apparatus is enabled to perform the following steps: receiving a third packet, where the third packet includes second index information and second identification information; if the second index information includes the first indication information and second indication information, determining that the second index information is generated by the first SFF proxy, and searching for, based on the second indication information, the first SFC header encapsulation information associated with the second indication information; and re-encapsulating, based on the first SFC header encapsulation information, the third packet to obtain a fourth packet, where the fourth packet includes the first SFC header encapsulation information and does not include the first index information.

In another example, the third packet is from the second device; or the third packet is a packet that is from the second device and that is forwarded by a second SFF proxy to the first SFF proxy.

In a possible implementation, when the program instructions are run by the processor, the apparatus is enabled to perform the following steps. Before the receiving a third packet, the following steps further include: receiving and caching third index information from the second SFF proxy, and third identification information and third SFC header encapsulation information that are associated with the third index information; and if the second index information included in the third packet is the same as the third index information, obtaining the third SFC header encapsulation information associated with the third index information, and re-encapsulating the third packet based on the third SFC header encapsulation information.

In a possible implementation, when the program instructions are run by the processor, the apparatus is enabled to perform the following steps: if it is determined, based on the second index information, that the second index information is not generated by the first SFF proxy, and no other information associated with the second index information is cached, sending the third packet to the second SFF proxy.

In a possible implementation, the second identification information is the same as or different from the first identification information.

In a possible implementation, when the program instructions are run by the processor, the apparatus is enabled to perform the following steps: sending, to the second SFF proxy, the first index information, and the first identification information and the first SFC header encapsulation information that are associated with the first index information.

In a possible implementation, the first identification information is used to identify a service flow to which the first packet belongs.

In a possible implementation, the service flow is an IP protocol service flow.

In a possible implementation, the SFC header encapsulation information is used to indicate a transmission path of the service flow.

In a possible implementation, the first identification information is carried in an extension field of the second packet.

In a possible implementation, if the first packet is an IP protocol packet, the extension field is an option field in the first packet.

According to a fourth aspect, an embodiment of this application provides a computer-readable medium, configured to store a computer program. The computer program includes instructions used to perform the method according to any one of the first aspect or the possible implementations of the first aspect.

According to a fifth aspect, an embodiment of this application provides a computer program. The computer program includes instructions used to perform the method according to any one of the first aspect or the possible implementations of the first aspect.

According to a sixth aspect, an embodiment of this application provides a chip. The chip includes a processing circuit and a transceiver pin. The transceiver pin and the processing circuit communicate with each other through an internal connection path. A processor performs the method according to any one of the first aspect or the possible implementations of the first aspect, to control a receiver pin to receive a signal, and control a transmitter pin to send the signal.

BRIEF DESCRIPTION OF DRAWINGS

To describe the technical solutions in the embodiments of this application more clearly, the following briefly describes the accompanying drawings used in describing the embodiments of this application. It is clearly that the accompanying drawings in the following description show merely some embodiments of this application, and a person of ordinary skill in the art may still derive other drawings from these accompanying drawings without creative efforts.

FIG. 4 is a schematic diagram depicting a structure of an option field according to an embodiment of this application;

DESCRIPTION OF EMBODIMENTS

The following clearly and completely describes the technical solutions in the embodiments of this application with reference to the accompanying drawings in the embodiments of this application. It is clearly that the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship between associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, a first target object, a second target object, and the like are used to distinguish different target objects, but are not used to describe a specific order of the target objects.

In addition, in the embodiments of this application, the word "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word "example" or "for example" or the like is intended to present a relative concept in a specific manner.

In the description of the embodiments of this application, unless otherwise stated, "a plurality of" means two or more than two. For example, a plurality of processing units refer to two or more processing units; and a plurality of systems refer to two or more systems.

In this application, an SFF proxy may use index information to associate an SFC header encapsulation information (which may also be an SFC header), encapsulate the index information into a packet, and send the packet to an SF. Therefore, after receiving the packet including the index information, the SFF proxy may obtain, based on the index information, the SFC header encapsulation information associated with the index information, to avoid impact on encapsulating the SFC header encapsulation information by the SFF proxy after the SF updates identification information.

Figure 1:
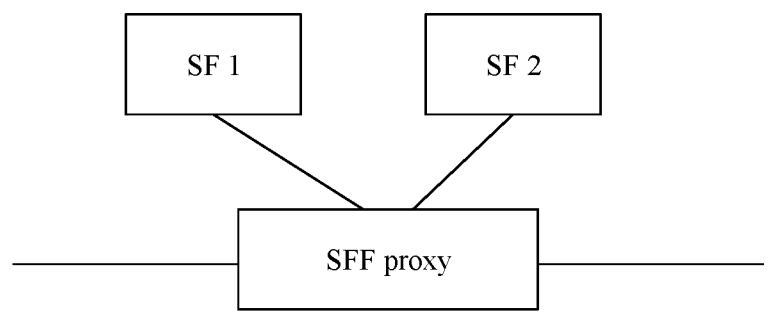
FIG. 1 shows an application scenario according to an embodiment of this application.

In an example, FIG. 1 shows one of communication systems (which may also be referred to as a packet processing system) according to an embodiment of this application. In FIG. 1, the communication system may include an SFF proxy, an SF 1, and an SF 2. In the embodiments of this application, for a specific implementation of the technical solutions in the scenario, refer to scenario 1.

Figure 2:
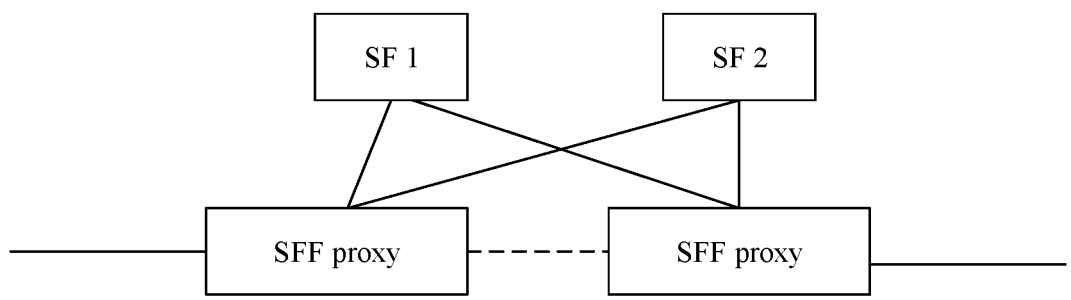
FIG. 2 shows an application scenario according to an embodiment of this application.

In another example, FIG. 2 shows one of communication systems according to an embodiment of this application. In FIG. 2, the communication system may include an SFF proxy 1, an SFF proxy 2, an SF 1, and an SF 2. In the embodiments of this application, for a specific implementation of the technical solutions in the scenario, refer to scenario 2. It should be noted that the scenario in which the communication system includes two SFF proxies may also be referred to as a dual-homing scenario. For example, after being processed by the SF 1, a packet sent by the SFF proxy 1 to the SF 1 may be returned to the SFF proxy 1, or may be sent to the SFF proxy 2. Specific steps are described in detail in the following embodiments. It should be further noted that, during actual application, there may be one or more SFF proxies and SFs. The quantity of the SFF proxies and the SFs in the communication system shown in FIG. 1 or FIG. 2 is merely an example. This is not limited in this application.

Scenario 1

Figure 3:
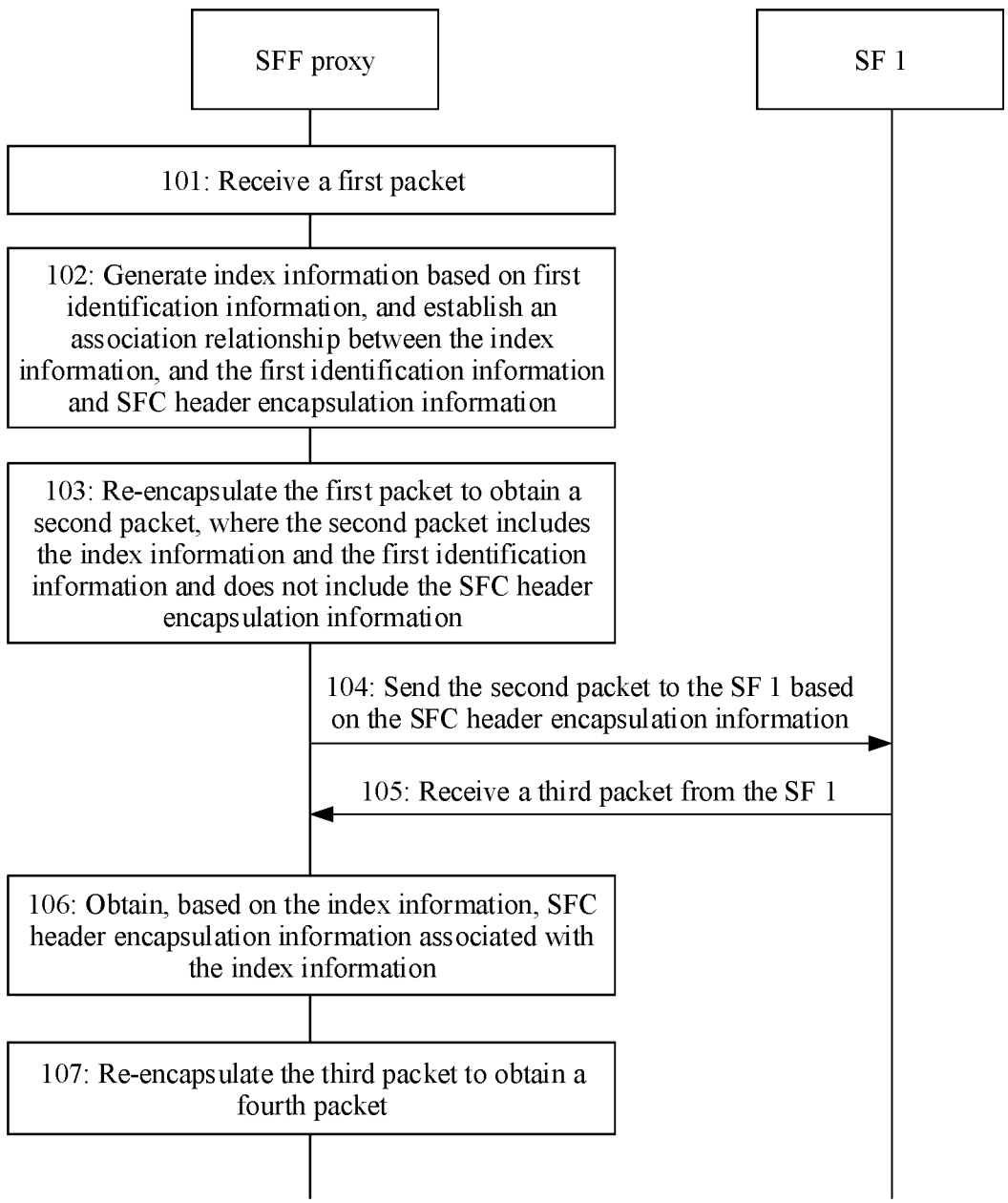
FIG. 3 is a schematic flowchart showing a packet processing method according to an embodiment of this application.

With reference to FIG. 1, FIG. 3 is a schematic flowchart showing a packet processing method according to an embodiment of this application. In FIG. 3:

Step 101: The SFF proxy receives a first packet.

Specifically, the SFF proxy receives the first packet from a first device (not shown in the figure). The first packet includes a header encapsulation part and a data part. Optionally, the header encapsulation part includes SFC header encapsulation information, and the information may be used to indicate a transmission path of a service flow to which the first packet belongs on a data link. To be specific, the SFF proxy may send the packet in the service flow to a next-hop device according to an indication of the SFC header encapsulation information.

Optionally, the data part may include but is not limited to encapsulation information and service data (or may be referred to as a payload (payload)) of another protocol layer. Optionally, the first device may be an SF device, or may be another network device. This is not limited in this application.

Optionally, the data part in the first packet may include identification information (referred to as first identification information hereinafter to be distinguished from identification information of other service flows). The first identification information may be used to identify the service flow to which the first packet belongs. In other words, one or more packets in the service flow all include the first identification information. The SFF proxy can identify, based on the identification information, whether one or more received packets belong to the same service flow. Optionally, the service flow in this application may be an IP protocol service flow. For example, the service flow is an Internet Protocol version 4 (Internet Protocol version 4, IPv4) service flow, or an Internet Protocol version 6 (Internet Protocol version 6, IPv6) service flow. Optionally, the service flow may alternatively be an Ethernet service flow. This is not limited in this application.

Optionally, the identification information may be carried in other protocol layer encapsulation information in the data part. In an example, the identification information may be a 5-tuple in the IP protocol encapsulation information, or one or more elements in the 5-tuple. For example, the first identification information of the first packet may be source address information and destination address information in the 5-tuple. The first identification information of the first packet may further be the source address information, the destination address information, and port information in the 5-tuple. In another example, the identification information may alternatively be a virtual private network identifier (Virtual Private Network Identifier, VPN ID) of the service flow.

Optionally, the identification information may be further carried in the service data. For example, the identification information may alternatively be a special value in the service data of a packet, and the special value needs to uniquely identify a service flow to which the packet belongs. In conclusion, a condition for selecting the identification information is specifically: The identification information can uniquely identify the service flow. The identification information may be specifically set based on an actual requirement. This is not limited in this application.

Step 102: The SFF proxy generates the index information based on the first identification information, and establishes an association relationship between the index information, and the first identification information and the SFC header encapsulation information.

Optionally, the SFF proxy may generate the index information based on the first identification information, where one piece of index information is corresponding to only one piece of identification information, or it may be understood that the index information is in a one-to-one correspondence with the service flow.

Optionally, a manner in which the SFF proxy allocates the index information may be: The SFF proxy detects whether the index information corresponding to the first identification information is locally cached. If the SFF proxy detects that the index information corresponding to (or associated with) the first identification information is cached, it indicates that the SFF proxy has allocated the index information to the service flow to which the packet belongs, and performs step 103. If the SFF proxy does not detect that the index information corresponding to the first identification information is locally cached, the SFF proxy allocates, in an available range of the index information, an unoccupied value to the first identification information as the index information. Optionally, the available range may be an index range preset by an apparatus with the SFF proxy. Optionally, the apparatus may be a device, or may be a board on which the SFF proxy is located in the device. For example, the device may include two boards (or may be referred to as interface boards): a board 1 and a board 2. An SFF proxy 1 may be set on the board 1, and an SFF proxy 2 may be set on the board 2. In this case, when the SFF proxy 1 allocates the index information, the SFF proxy may select an unoccupied value from an index range (for example, 1 to 100) supported by the board 1, and allocate it to the first identification information.

Still refer to FIG. 3. After generating the index information, the SFF proxy may establish the association relationship between the index information, and the SFC header encapsulation information and the first identification information. Optionally, the SFF proxy may locally generate an index table, and the index table includes one or more pieces of index information and associated data corresponding to each piece of index information, where the associated data includes the SFC header encapsulation information and the first identification information that are associated with the index information.

Optionally, before performing step 102, the SFF proxy may traverse local configurations, to determine whether the solution described in this application needs to be executed on the packet sent to the SF. If the solution is not executed, the SFF proxy may process the first packet according to a technical solution in an embodiment of a conventional technology. For example, if the SFC header encapsulation information indicates to send the first packet to the SF 2, and the SFF proxy determines, by retrieving the local configurations, that the technical solution described in this application does not need to be implemented for the SF 2, the SFF proxy may remove the SFC header encapsulation information and re-encapsulate the first packet, to generate a packet that meets a transmission protocol between the SFF proxy and the SF 2. In addition, the SFF proxy may record a correspondence between the SFC header encapsulation information and the identification information in the first packet. Then, the SFF proxy sends the encapsulated packet to the SF 2 and receives a packet returned by the SF 2. The SFF proxy obtains associated SFC header encapsulation information based on identification information in the packet, and re-encapsulates and transmits the packet. It should be noted that cases in which the technical solutions described in this application do not need to be enabled may include the following: The SF does not change the identification information, and the SF is a previous hop of the SFF proxy, and a next hop of the SFF proxy is statically configured. For example, the SF returns a packet including updated identification information to the SFF proxy, and the SFF proxy may find an address of the next hop device based on a static configuration. In other words, if processing (including updating or not updating the identification information) on the packet by the SF does not affect packet transmission by the SFF proxy, the SFF proxy may not use the technical solutions described in this application for the SF of this type.

Step 103: The SFF proxy re-encapsulates the first packet to obtain a second packet, where the second packet includes the index information and the first identification information and does not include the SFC header encapsulation information.

Specifically, the SFF proxy re-encapsulates the first packet based on the index information, to obtain a packet that complies with a transmission protocol between the SFF proxy and a next-hop node. A process of re-encapsulating the first packet by the SFF proxy may be as follows: The SFF proxy strips the SFC header encapsulation information from the first packet, obtains the data part, and encapsulates the generated index information into the data part. Optionally, the SFF proxy may further encapsulate second header encapsulation information into the data part, where the second header encapsulation information may be: virtual extensible local area network (Virtual Extensible Local Area Network, VXLAN) header encapsulation information or generic routing encapsulation (Generic Routing Encapsulation, GRE, defined in RFC 2784, is a common tunneling technology) header encapsulation information, IP tunnel (an IPv4 tunnel is defined in RFC 2003 and an IPv6 tunnel, for example, IP-in-IP, is defined in RFC 2473) header encapsulation information, or the like. A specific format of header encapsulation information may be set according to a protocol between the SFF proxy and the SF. This is not limited in this application. In another example, the SFF proxy may encapsulate a virtual local area network tag (Virtual Local Area Network tag, VLAN tag) into the data part. In still another example, if an IP protocol is supported between the SFF proxy and the SF, the SFF proxy may send the payload to the SF.

For example, if a protocol between the SFF proxy and an SF 1 is a VXLAN protocol, during the re-encapsulation process, after removing the SFC header encapsulation information, the SFF proxy may add VXLAN header encapsulation information to the packet, to obtain a second packet that supports the VXLAN protocol. In other words, the second packet may include but is not limited to: the VXLAN header encapsulation information and the data part (including the identification information and the payload) of the original packet (the first packet).

Optionally, the index information may be carried in an extension field of the second packet. In this application, the service flow may be an IP service flow, and in an IP packet, an extension field in which an index packet is located may be an option (Option) field of an IPv4 or IPv6 packet.

For example, in an example of the IPv4 packet, a format of the option field is shown in FIG. 4. In the standard, the option field of the IPv4 packet has four experimental options, that is, when a value of the option type (type) is 30, 94, 158, and 222, it indicates that the option field is an extensible experimental option field. Refer to FIG. 4. The value of the option type may be 30, 94, 158, or 222, and is used to indicate that a cache index (cache-index) field carries the index information. Optionally, the option field may further include but is not limited to: an S field (a function of this field is described in the following embodiments), an option length field, a sub-option type field, a sub-option data field, an R field, and a slot number field. Optionally, in a single SFF proxy scenario, the option field may not carry the S field. For information carried in another field, refer to the conventional technology and details are not described herein.

Optionally, in a process of encapsulating the index information into the option field, if an available capacity of the option field is less than a required capacity of the index information, the SFF proxy may strip an option from the option field, locally cache the option, and establish an association relationship between the stripped option and the index information. For example, if a remaining capacity of the option field is 2 bytes and the index information needs to occupy 4 bytes, the SFF proxy may strip an option (or content) from the option field, for example, strip an option A with a length of 4 bits, change the available capacity of the option field to 6 bytes, and then encapsulate the index information into the option field. The SFF proxy locally caches the option A, and establishes an association relationship between the option A and the index information. If the SFF proxy receives a packet including the index information, the SFF proxy may query the associated SFC header encapsulation information and the first identification information based on the index information, further query the option A, strip the index information, and re-encapsulate the option A into the packet.

Step 104: Send the second packet to the SF 1 based on the SFC header encapsulation information.

As shown above, the SFC header encapsulation information is used to indicate the transmission path of the packet, and the SFF proxy may send the second packet to a specified SF, for example, the SF 1, according to the indication of the SFC header encapsulation information. In this embodiment of the present disclosure, the SF 1 is referred to as a second device.

Step 105: The SFF proxy receives a third packet from the SF 1.

Specifically, the SF 1 processes the second packet to obtain the third packet, and returns the third packet to the SFF proxy. The third packet includes but is not limited to: second identification information and index information.

Optionally, as described above, the SF 1 may or may not update the first identification information. Therefore, the third packet may include the second identification information, and the second identification information may be the same as or different from the first identification information.

Step 106: The SFF proxy obtains, based on the index information, SFC header encapsulation information associated with the index information.

Optionally, the SFF proxy may obtain, based on the index information in the third packet, associated data associated with the index information. The associated data includes the SFC header encapsulation information and the first identification information. In an example, the SFF proxy may match the index information with the one or more pieces of index information in the index table, and obtain associated data corresponding to successfully matched index information, where the associated data includes the SFC header encapsulation information and the first identification information that are associated with the index information.

Step 107: The SFF proxy re-encapsulates the third packet to obtain a fourth packet.

In an example, the SFF proxy may decapsulate the third packet to obtain the original data part, and re-encapsulate the original data part to obtain the fourth packet. Optionally, the SFF proxy may re-encapsulate the obtained SFC header encapsulation information into the original data part. Correspondingly, the fourth packet obtained after the re-encapsulation may include but is not limited to: the second identification information and the SFC header encapsulation information.

Optionally, as shown in FIG. 1, the SF 2 also exists in the system. In an example, if the SFC header encapsulation information indicates that the next hop of the SFF proxy is the SF 2, the SFF proxy needs to send the packet (the fourth packet) to the SF 2. Correspondingly, the SFF proxy performs the method in steps 101 to 107. To be specific, after determining to enable a manner of replacing the index information for the SF 2 in this embodiment of this application, the SFF proxy re-encapsulates the fourth packet. It should be noted that when allocating index information to the fourth packet, the SFF proxy may determine, based on the identification information of the fourth packet, that the index information associated with the identification information already exists. Therefore, the SFF proxy does not need to generate the index information for the fourth packet, and may directly perform subsequent steps by using the generated index information and the associated data. For specific details, refer to steps 102 to 107. Details are not described herein again.

In another example, if the SF 1 is a last SF in a service chain, the SFF proxy may no longer encapsulate the SFC header encapsulation information into the packet.

Optionally, in this application, due to a cache capacity limitation of the SFF proxy, the SFF proxy overwrites index information and associated data that are arranged first in the index table with newly generated index information and associated data. Optionally, the SFF proxy may further set aging time. For example, if the SFF proxy does not use the index information and the associated data within the aging time (for example, 10 minutes), the SFF proxy may delete the index information and the associated data.

Figure 5A:
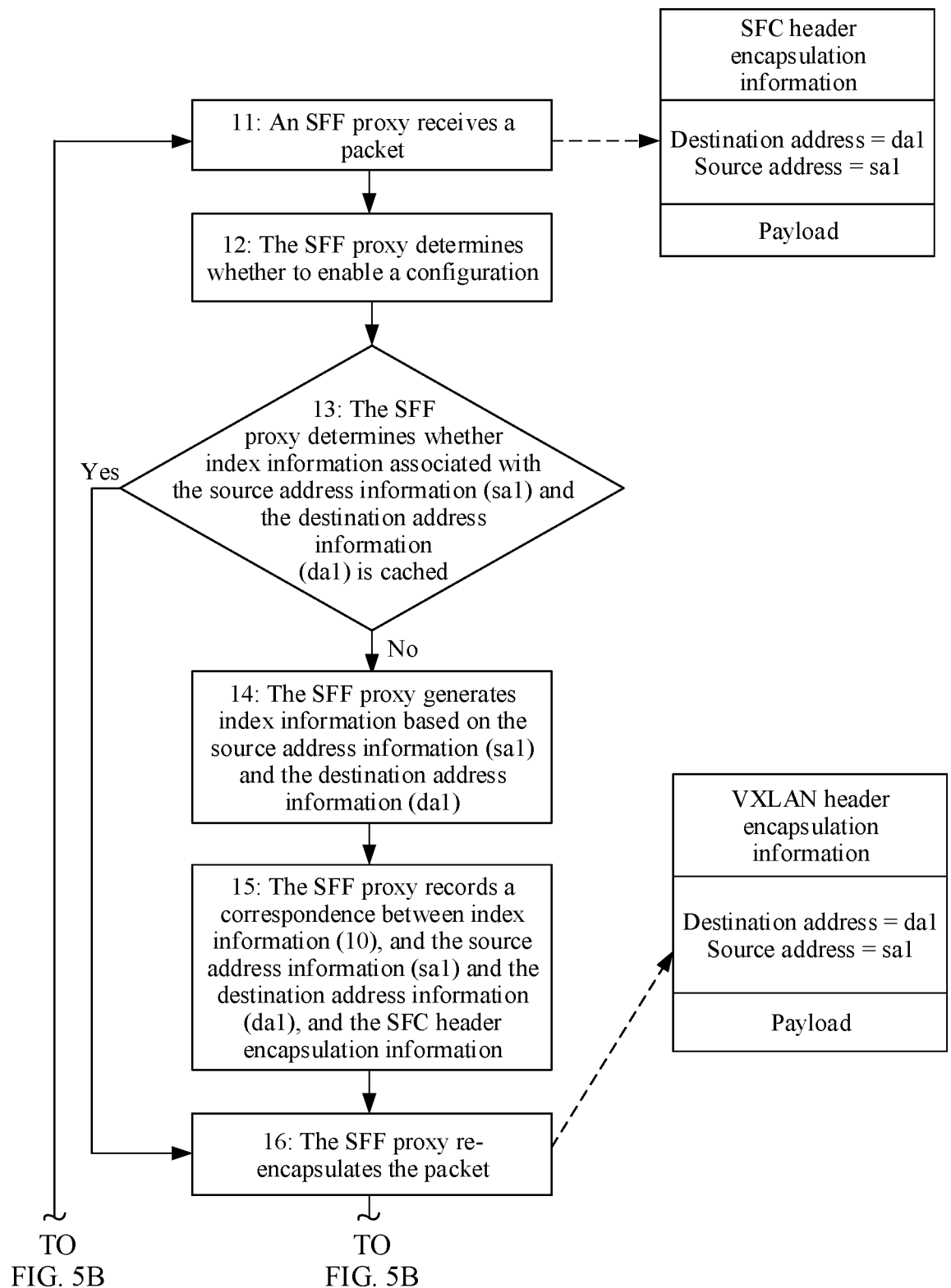
FIG. 5A and FIG. 5B are a schematic flowchart showing a packet processing method according to an embodiment of this application.
Figure 5B:
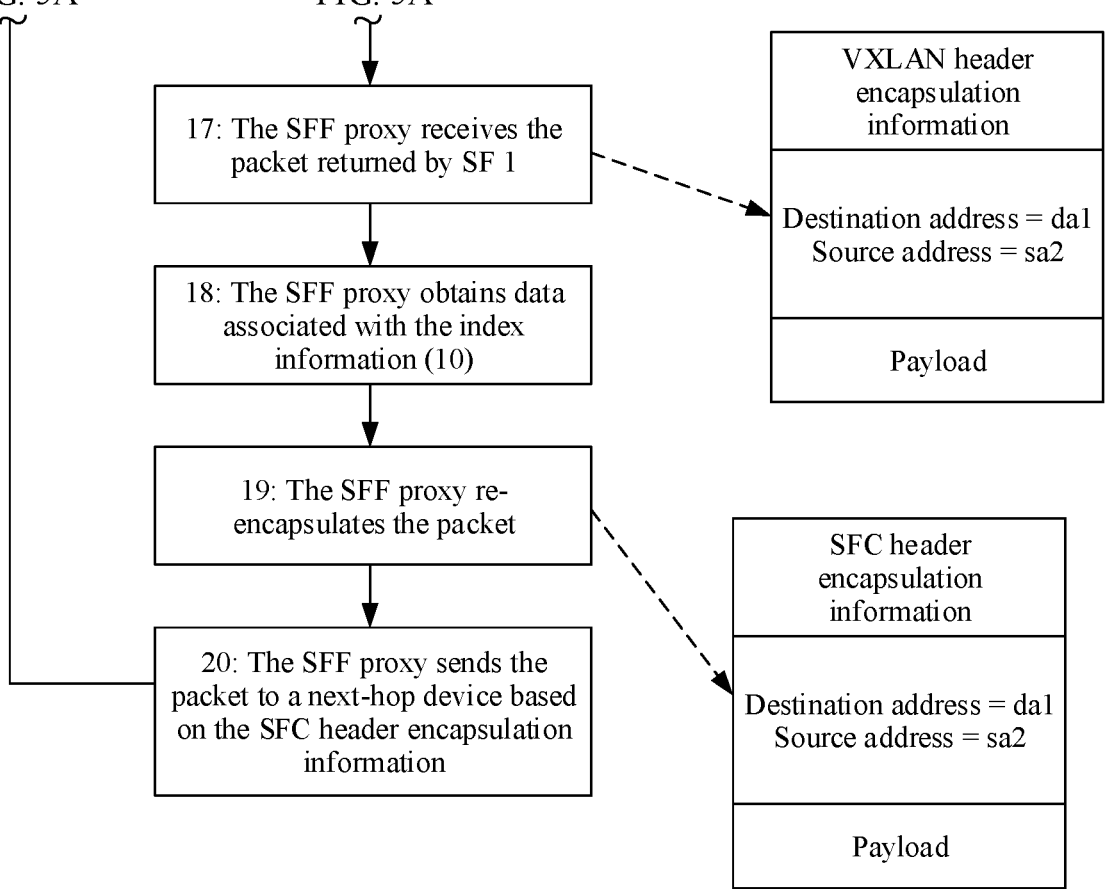

To make a person skilled in the art better understand the technical solutions in the embodiments of this application, the following describes in detail by using a specific embodiment. Based on the embodiment shown in FIG. 4, as shown in FIG. 5A and FIG. 5B, FIG. 5A and FIG. 5B are an example of a schematic flowchart showing a packet processing method. In FIG. 5A and FIG. 5B:

11: An SFF proxy receives a packet.

The packet includes but is not limited to SFC header encapsulation information and a data part, and the data part further includes IP encapsulation information and a payload. The IP encapsulation information further includes: source address information (sa1) and destination address information (da1). It should be noted that a packet structure shown in the figure is merely an example. This is not limited in this application.

12: The SFF proxy determines whether to enable a configuration.

The SFF proxy retrieves the configuration and determines to enable the configuration for an SF 1, so that an index information encapsulation manner in this embodiment of this application can be performed.

13: The SFF proxy determines whether index information associated with the source address information (sa1) and the destination address information (da1) is cached.

Specifically, the SFC header encapsulation information indicates the SFF proxy to send the packet to the SF 1. The SFF proxy decapsulates the packet and obtains the source address information (sa1) and the destination address information (da1).

The SFF proxy matches the source address information (sa1) and the destination address information (da1) with one or more index entries in an index table. If the matching succeeds, it is determined that the index information has been allocated to a data flow to which the packet belongs, and this process proceeds to 16. If the matching fails, it may be determined that the associated index information is not cached, and this process proceeds to 14.

14: The SFF proxy generates index information based on the source address information (sa1) and the destination address information (da1).

The SFF proxy selects an unoccupied value within a range allowed by a device, for example, 10, as the index information corresponding to the source address information (sa1) and the destination address information (da1).

15: The SFF proxy records a correspondence between the index information (10), and the source address information (sa1) and the destination address information (da1), and the SFC header encapsulation information.

The SFF proxy caches the index table, and the index table includes the one or more index entries. Each index entry includes index information and data associated with the index information. The SFF proxy may correspondingly record the index information (10), the source address information (sa1) and the destination address information (da1), and the SFC header encapsulation information in an index entry.

16: The SFF proxy re-encapsulates the packet.

Specifically, re-encapsulating the packet by the SFF proxy may be divided into two parts. A first part is encapsulating the index information into an option field. For a specific manner, refer to the foregoing description. Details are not described herein again. A second part is an optional part, to be specific, the SFF proxy encapsulates a header that may support a transmission protocol between the SFF proxy and the SF 1 into the packet.

In this embodiment, the SFF proxy determines that a tunnel between the SFF proxy and the SF 1 is a VXLAN tunnel. For a determining manner, refer to the conventional technology. Details are not described in this application. Then, the SFF proxy encapsulates the decapsulated packet with VXLAN header encapsulation information and sends a re-encapsulated packet to the SF 1.

17: The SFF proxy receives the packet returned by the SF 1.

Specifically, in a single-homing scenario, after processing the packet, the SF 1 returns the packet to the SFF proxy. This embodiment describes an example in which the SF 1 updates the source address information (sa1) to an sa2.

18: The SFF proxy obtains data associated with the index information (10).

Specifically, the SFF proxy decapsulates the packet to obtain the index information (10). Then, the SFF proxy may match in the index table based on the index information (10), find the index entry, and extract SFC header encapsulation information associated with the index entry.

19: The SFF proxy re-encapsulates the packet.

Specifically, after the SFF proxy strips the index information (10) and re-encapsulates the packet, a schematic diagram showing a structure of the obtained packet is shown in the figure. The re-encapsulated packet includes the SFC header encapsulation information and the data part. The data part further includes the IP encapsulation information and the payload, and the IP encapsulation information further includes the source address information (sa2) and the destination address information (da1).

20: The SFF proxy sends the packet to a next-hop device based on the SFC header encapsulation information.

Optionally, if the next-hop device is still an SF, and the SFF proxy enables the configuration, the foregoing steps are repeated.

Scenario 2

Figure 6:
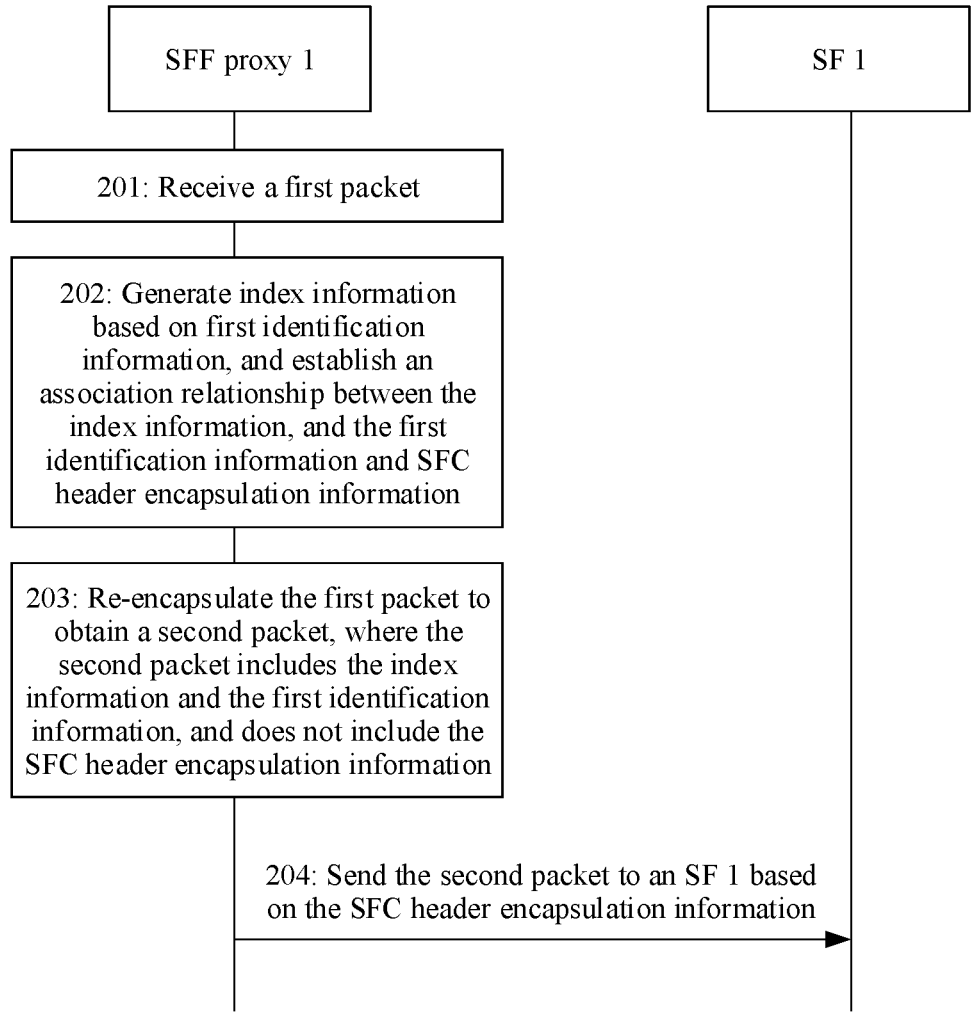
FIG. 6 is a schematic flowchart showing a packet processing method according to an embodiment of this application.

With reference to FIG. 2, FIG. 6 is a schematic flowchart showing a packet processing method according to an embodiment of this application. In FIG. 6:

Step 201: An SFF proxy 1 receives a first packet.

Step 202: The SFF proxy 1 generates index information based on first identification information, and establishes an association relationship between the index information, and the first identification information and SFC header encapsulation information.

Optionally, the index information may include first indication information and second indication information, where the first indication information may be used to indicate that the index information is generated by the SFF proxy 1, and the second indication information may be used to associate the SFC header encapsulation information with identification information. In other words, the second indication information is generated based on the identification information. For a specific manner of generating the second indication information, refer to step 102. Details are not described herein again.

Optionally, in this application, the SFF proxy 1 and an SFF proxy 2 may pre-configure their respective indication information. For example, when the indication information configured by the SFF proxy 1 is 0, it indicates that the index information including the indication information is generated by the SFF proxy 1. When the indication information configured by the SFF proxy 2 is 1, it indicates that index information including the indication information is generated by the SFF proxy 2. A specific configuration of the indication information may be set based on an actual requirement. This is not limited in this application.

Optionally, the SFF proxy 1 and the SFF proxy 2 may or may not exchange their respective indication information. For example, if the SFF proxy 1 and the SFF proxy 2 exchange their respective indication information, when identifying the index information including the indication information being 1, the SFF proxy 1 may determine that the index information is generated by the SFF proxy 2. If the SFF proxy 1 and the SFF proxy 2 do not exchange their respective indication information, because there are only two SFF proxies in a system, when identifying that a value of the indication information is not a pre-configured value (the value is 0), the SFF proxy 1 may determine that the index information is generated by the SFF proxy 2.

Step 203: The SFF proxy 1 re-encapsulates the first packet to obtain a second packet, where the second packet includes the index information and the first identification information and does not include the SFC header encapsulation information.

Optionally, the SFF proxy 1 may encapsulate the first indication information and the second indication information into an extension field of the packet.

In an example, still as shown in FIG. 4, the SFF proxy 1 may encapsulate the first indication information into an S field. Optionally, if the first indication information is 0, it may indicate that the index information is generated by the SFF proxy 1, or if the first indication information is 1, it may indicate that the index information is generated by the SFF proxy 2. The second indication information may be encapsulated into an option-index field.

For other details, refer to step 103. Details are not described herein.

Step 204: Send the second packet to an SF 1 based on the SFC header encapsulation information.

Figure 7:
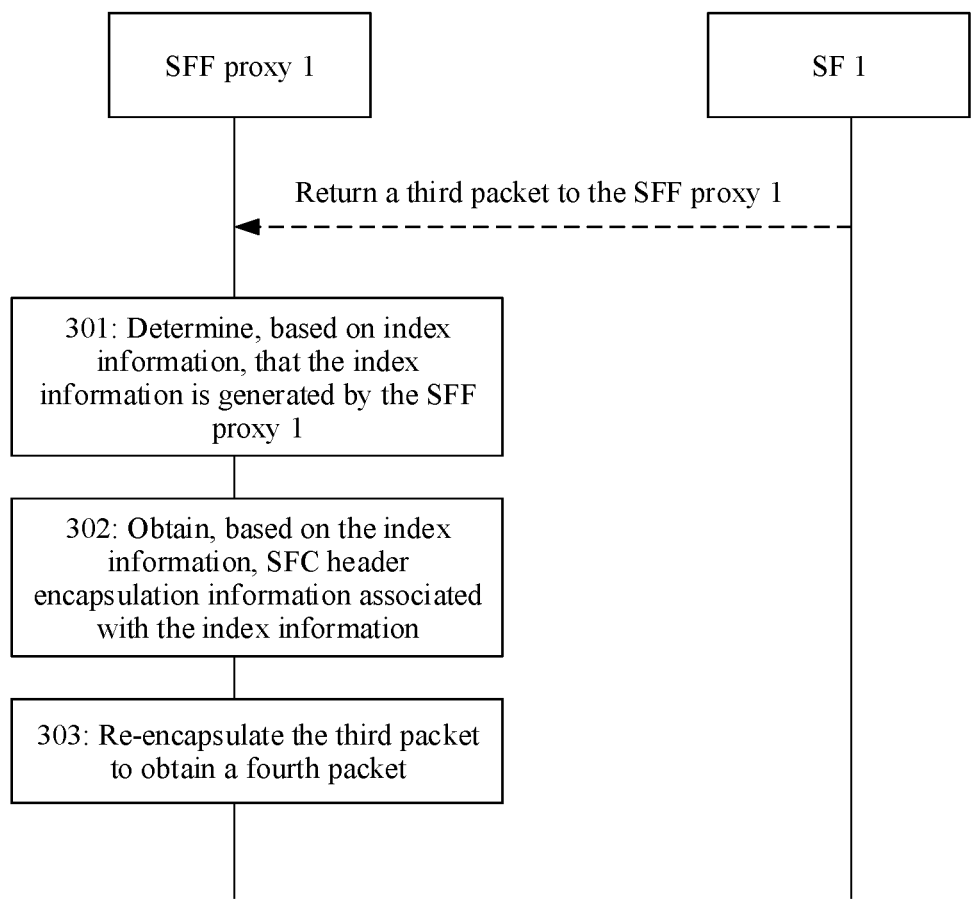
FIG. 7 is a schematic flowchart showing a packet processing method according to an embodiment of this application.
Figure 8:
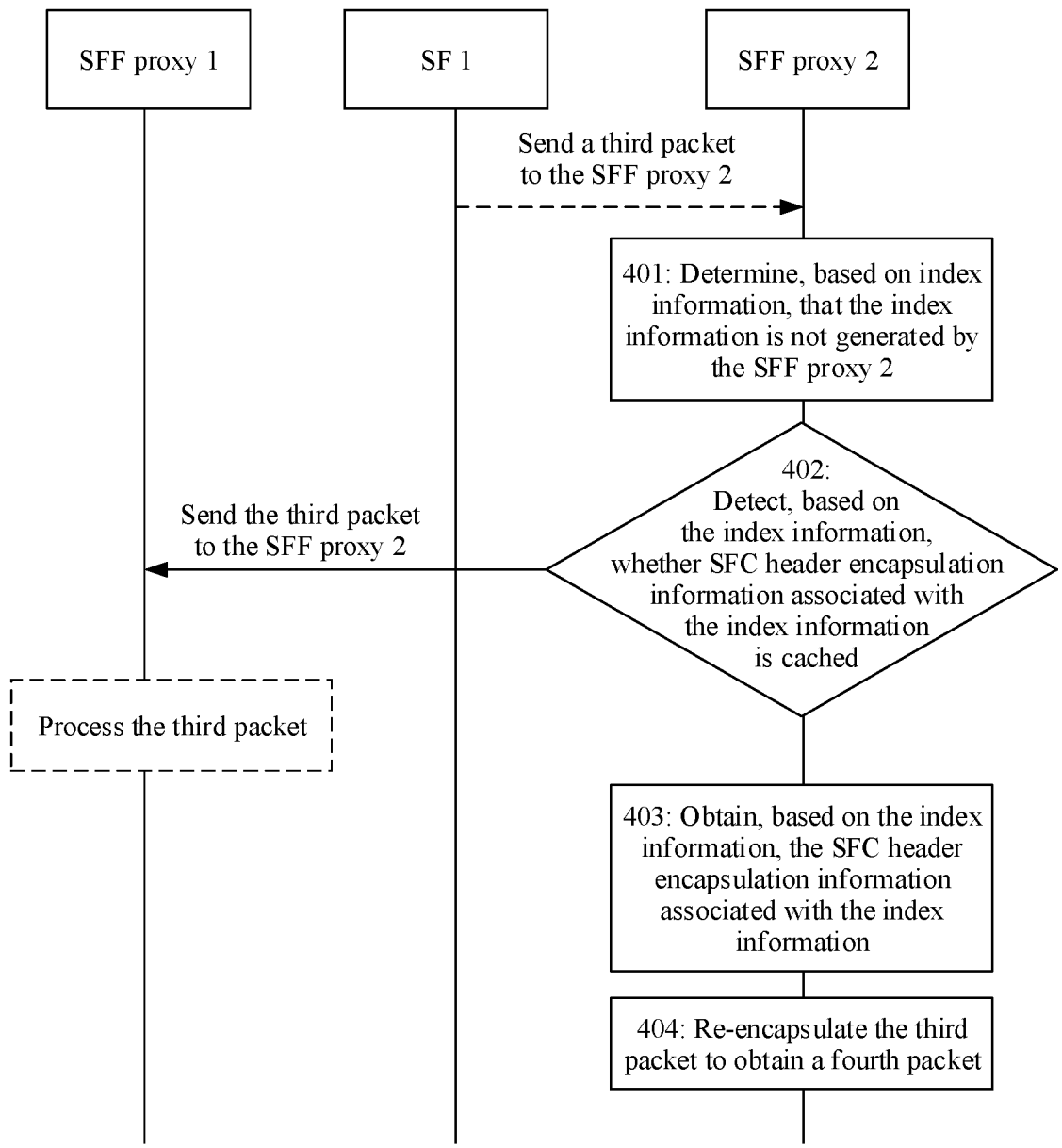
FIG. 8 is a schematic flowchart showing a packet processing method according to an embodiment of this application.

The SF 1 processes the second packet to obtain a third packet, where the third packet includes but is not limited to second identification information and index information. The second identification information may be the same as or different from the first identification information. In an example, the SF 1 may return the third packet to the SFF proxy 1. A procedure thereof is shown in FIG. 7. In another example, the SF 1 may send the third packet to the SFF proxy 2. A procedure thereof is shown in FIG. 8.

Based on the embodiment shown in FIG. 6, as shown in FIG. 7, FIG. 7 is an example of a schematic flowchart showing a packet processing method. In FIG. 7:

Step 301: An SFF proxy 1 determines, based on index information, that the index information is generated by the SFF proxy 1.

Specifically, the SFF proxy 1 obtains index information in a third packet, and the SFF proxy 1 may determine, based on first indication information in the index information, that the index information is generated by the SFF proxy 1.

Step 302: The SFF proxy 1 obtains, based on the index information, SFC header encapsulation information associated with the index information.

Specifically, after determining that the index information is generated by the SFF proxy 1, the SFF proxy 1 may match second indication information with a local index table, and obtain associated data that is successfully matched. The associated data includes but is not limited to the SFC header encapsulation information and first identification information.

Step 303: Re-encapsulate the third packet to obtain a fourth packet.

Based on the embodiment shown in FIG. 6, as shown in FIG. 8, FIG. 8 is an example of a schematic flowchart showing a packet processing method. In FIG. 8:

Step 401: An SFF proxy 2 determines, based on index information, that the index information is not generated by the SFF proxy 2.

Specifically, the SFF proxy 2 obtains index information in a third packet, and determines, based on first indication information in the index information, that the index information is generated by an SFF proxy 1.

Step 402: The SFF proxy 2 detects, based on the index information, whether SFC header encapsulation information associated with the index information is cached.

In an example, the SFF proxy 1 and the SFF proxy 2 may share their respective index tables. For a manner of sharing data, refer to the conventional technology. Details are not described in this application. It should be noted that, as described above, the SFF proxy selects the index information (that is, second indication information) from an available range of an apparatus. Therefore, second indication information allocated by a plurality of SFF proxies may be duplicate. Correspondingly, when caching index information and associated data shared by another SFF proxy, the SFF proxy also needs to record an SFF proxy that generates the index information.

Optionally, after determining that the index information is generated by the SFF proxy 1, the SFF proxy 2 may detect whether the index information is locally cached. In an example, if the SFF proxy 2 detects the index information, the SFF proxy 2 performs step 403. In another example, if the SFF proxy 2 does not detect that the index information and other information associated with the index information are cached, the SFF proxy 2 may further detect whether a communication link is pre-established between the SFF proxy 2 and the SFF proxy 1. Optionally, if the communication link is pre-established between the SFF proxy 1 and the SFF proxy 2, the SFF proxy 2 may send the third packet to the SFF proxy 1 for processing. For a manner of processing the third packet by the SFF proxy 1, refer to steps 302 to 304. Details are not described herein again. Optionally, if no communication link exists between the SFF proxy 1 and the SFF proxy 2, the SFF proxy 2 discards the third packet.

Step 403: The SFF proxy 2 obtains, based on the index information, the SFC header encapsulation information associated with the index information.

Specifically, after determining that the index information is generated by the SFF proxy 1, the SFF proxy 2 finds that the index information generated by the SFF proxy 1 is locally cached, and the SFF proxy 2 may obtain, based on the second indication information in the index information, the SFC header encapsulation information associated with the index information.

Step 404: Re-encapsulate the third packet to obtain a fourth packet.

The foregoing mainly describes the solutions provided in the embodiments of this application from a perspective of interaction between network elements. It can be understood that, to implement the foregoing functions, the SFF proxy includes corresponding hardware structures and/or software modules for performing the functions. A person skilled in the art should be easily aware that, in combination with the examples described in the embodiments disclosed in this specification, units, algorithms, and steps may be implemented by hardware or a combination of hardware and computer software in the embodiments of this application. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, division into functional modules may be performed on the SFF proxy based on the foregoing method examples. For example, each functional module may be obtained through division based on a corresponding function, or two or more functions may be integrated into one processing module. The integrated module may be implemented in a form of hardware, or may be implemented in a form of a software function module. It should be noted that, in this embodiment of this application, division into the modules is an example, and is merely a logical function division. In actual implementation, another division manner may be used.

Figure 9:
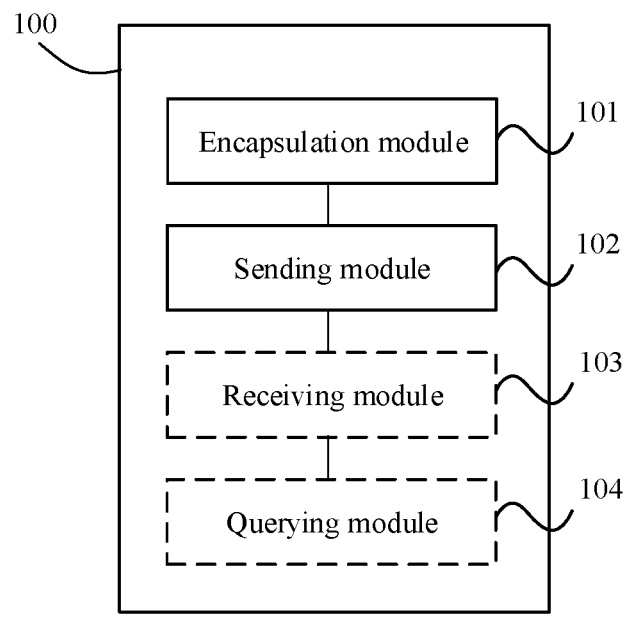
FIG. 9 is a schematic diagram depicting a structure of an SFF proxy according to an embodiment of this application.

When the functional modules are obtained through division corresponding to the functions, FIG. 9 is a possible schematic diagram showing a structure of the SFF proxy 100 in the foregoing embodiments. As shown in FIG. 9, the SFF proxy may include an encapsulation module 101 and a sending module 102. The encapsulation module 101 may be configured to perform the step of "re-encapsulate a first packet from the first device to obtain a second packet". For example, the module may be configured to support the SFF proxy to perform step 103 and step 203 in the foregoing method embodiments. The encapsulation module 101 may be configured to perform the step of "sending the second packet to a second device based on the first SFC header encapsulation information". For example, the module may be configured to support the SFF proxy to perform step 104 and step 204 in the foregoing method embodiments.

Optionally, the SFF proxy 100 may further include a receiving module 103 and a querying module 104. In an example, the receiving module 103 may be configured to perform the step of "receiving a third packet", and the querying module 104 may be configured to perform the step of "if the second index information includes the first indication information and second indication information, determining that the second index information is generated by the first SFF proxy, and searching for, based on the second indication information, the first SFC header encapsulation information associated with the second indication information". Correspondingly, the encapsulation module 101 may be further configured to perform the step of "re-encapsulating, based on the first SFC header encapsulation information, the third packet to obtain a fourth packet".

In another example, the receiving module 103 may be configured to perform the step of "receiving and caching third index information from the second SFF proxy, and third identification information and third SFC header encapsulation information that are associated with the third index information". The encapsulation module 101 may be further configured to perform the step of "if the second index information included in the third packet is the same as the third index information, obtaining the third SFC header encapsulation information associated with the third index information, and re-encapsulating the third packet based on the third SFC header encapsulation information".

In still another example, the sending module 102 may be further configured to perform the step of "if it is determined, based on the second index information, that the second index information is not generated by the first SFF proxy, and no other information associated with the second index information is cached, sending the third packet to the second SFF proxy".

In still another example, the sending module 102 may be further configured to perform the step of "sending, to the second SFF proxy, the first index information and the first identification information and the first SFC header encapsulation information that are associated with the first index information".

Figure 10:
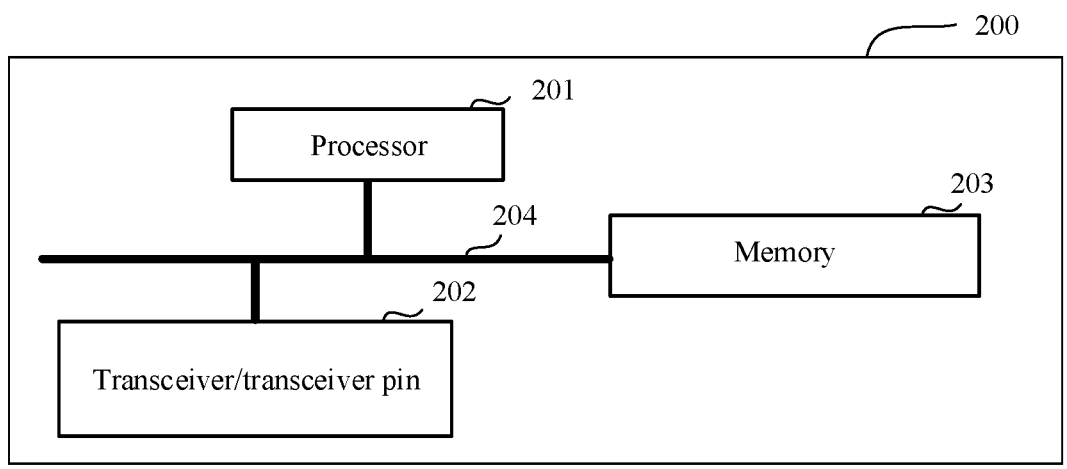
FIG. 10 is a schematic diagram depicting a structure of an apparatus according to an embodiment of this application.

It should be noted that the SFF proxy in this embodiment of this application may be a physical apparatus, or may be a virtual apparatus. FIG. 10 is a schematic block diagram of an apparatus 200 that can run an SFF proxy according to an embodiment of this application. The apparatus 200 may include a processor 201 and a transceiver/transceiver pin 202. Optionally, the apparatus 200 further includes a memory 203. The processor 201 may be configured to perform steps performed by the apparatus in the foregoing method embodiments, and control a receiver pin to receive a signal, and control a transmitter pin to send a signal.

Components of the apparatus 200 are coupled together by using a bus 204. In addition to a data bus, the bus system 204 further includes a power bus, a control bus, and a status signal bus. However, for clarity of description, various buses are marked as the bus system 204 in the figure.

Optionally, the memory 203 may be configured to store instructions in the foregoing method embodiments.

It should be understood that the apparatus 200 according to this embodiment of this application may perform steps performed by the SFF proxy in the method embodiments, and the foregoing and other management operations and/or functions of the elements in the apparatus 200 are separately intended to implement corresponding steps of the foregoing methods. For brevity, details are not described herein again.

All related content of the steps in the foregoing method embodiments may be cited in function descriptions of corresponding function modules. Details are not described herein again.

Based on a same technical idea, an embodiment of this application further provides a computer-readable storage medium. The computer-readable storage medium stores a computer program, the computer program includes at least one segment of code, and the at least one segment of code may be executed by an apparatus, to control the apparatus to implement the foregoing method embodiments.

Based on a same technical idea, an embodiment of this application further provides a computer program. When the computer program is executed by an apparatus, the foregoing method embodiments are implemented.

The program may be all or partially stored in a storage medium encapsulated with a processor, or may be partially or all stored in a memory not encapsulated with a processor.

Based on a same technical idea, an embodiment of this application further provides a processor. The processor is configured to implement the foregoing method embodiments. The processor may be a chip.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in network equipment. Certainly, the processor and the storage medium may exist in network equipment as discrete components.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose computer or a dedicated computer.

The embodiments of this application are described above with reference to the accompanying drawings. However, this application is not limited to the foregoing specific implementations. The foregoing specific implementations are merely exemplary rather than limiting. A person of ordinary skill in the art, under the teachings of this application, can make many forms without departing from the scope of the purpose and claims of this application, which fall within the protection of this application.

What is claimed is:

1. A packet processing method, applied to a first service function forwarder proxy (SFF proxy), wherein the method comprises:
   re-encapsulating a first packet from a first device to obtain a second packet, wherein the first packet comprises first identification information and first service function chain (SFC) header encapsulation information, the second packet comprises first index information and the first identification information and does not comprise the first SFC header encapsulation information, and the first index information is associated with the first SFC header encapsulation information and the first identification information; and
   sending the second packet to a second device based on the first SFC header encapsulation information.

2. The method according to claim 1, wherein the first index information is further used to indicate that the first index information is generated by the first SFF proxy.

3. The method according to claim 2, wherein the first index information comprises first indication information and second indication information, the first indication information is used to indicate that the first index information is generated by the first SFF proxy, and the second indication information is used to associate the first SFC header encapsulation information with the first identification information.

4. The method according to claim 3, wherein the method further comprises:
   receiving a third packet, wherein the third packet comprises second index information and second identification information;
   when the second index information comprises the first indication information and the second indication information, determining that the second index information is generated by the first SFF proxy, and searching for, based on the second indication information, the first SFC header encapsulation information associated with the second indication information; and
   re-encapsulating, based on the first SFC header encapsulation information, the third packet to obtain a fourth packet, wherein the fourth packet comprises the first SFC header encapsulation information and does not comprise the first index information.

5. The method according to claim 4, wherein the third packet is one of from the second device or forwarded by a second SFF proxy to the first SFF proxy.

6. The method according to claim 4, wherein before the receiving a third packet, the method further comprises:
   receiving and caching third index information from a second SFF proxy, and third identification information and third SFC header encapsulation information that are associated with the third index information; and
   when the second index information comprised in the third packet is the same as the third index information, obtaining the third SFC header encapsulation information associated with the third index information, and re-encapsulating the third packet based on the third SFC header encapsulation information.

7. The method according to claim 4, wherein the method further comprises:
   when it is determined, based on the second index information, that the second index information is not generated by the first SFF proxy, and no other information associated with the second index information is cached, sending the third packet to a second SFF proxy.

8. A first service function forwarder proxy (SFF proxy) comprising a non-transitory computer readable memory storing instructions, that when executed by a processor cause the SFF proxy to:
   re-encapsulate a first packet from a first device to obtain a second packet, wherein the first packet comprises first identification information and first service function chain (SFC) header encapsulation information, the second packet comprises first index information and the first identification information and does not comprise the first SFC header encapsulation information, and the first index information is associated with the first SFC header encapsulation information and the first identification information; and
   send the second packet to a second device based on the first SFC header encapsulation information.

9. The non-transitory computer readable memory according to claim 8, wherein
   the second device is configured to process the second packet to obtain a third packet, wherein the third packet comprises the first index information and second identification information, and the second identification information is the same as or different from the first identification information; and send the third packet to the first SFF proxy; and
   the first SFF proxy is further configured to re-encapsulate the third packet from the second device to obtain a fourth packet, wherein the third packet comprises the second identification information and the first index information, and the fourth packet comprises the second identification information and the first SFC header encapsulation information and does not comprise the first index information.

10. The system according to claim 8, wherein the first index information is further used to indicate that the first index information is generated by the first SFF proxy.

11. The system according to claim 10, wherein the system further comprises a second SFF proxy; and
   the second device is configured to process the second packet to obtain a third packet, wherein the third packet comprises the first index information and second identification information, and the second identification information is the same as or different from the first identification information; and send the third packet to the first SFF proxy or the second SFF proxy.

12. The system according to claim 11, wherein if the second device sends a third packet to the second SFF proxy,
   the second SFF proxy is further configured to determine, based on the first index information, that the first index information is generated by the first SFF proxy, detect that the first SFC header encapsulation information associated with the first index information is locally cached, and re-encapsulate the third packet based on the first SFC header encapsulation information, to obtain a fourth packet.

13. The system according to claim 12, wherein if the second device sends a third packet to the second SFF proxy,
   the second SFF proxy is further configured to determine, based on the first index information, that the first index information is generated by the first SFF proxy, detect that no other information associated with the first index information is locally cached, and send the third packet to the first SFF proxy.

14. The system according to claim 10, wherein the instructions further cause
   the first SFF proxy to send, to a second SFF proxy, the first index information, and the first identification information and the first SFC header encapsulation information that are associated with the first index information; and
   the second SFF proxy is further configured to receive and cache the first index information, the first identification information, and the first SFC header encapsulation information.

15. A packet processing apparatus, applied to a first service function forwarder proxy (SFF proxy), wherein the apparatus comprises:
   a non-transitory memory and a processor, wherein the memory is coupled to the processor; and
   the memory comprises program instructions, and when the program instructions are run by the processor to cause the apparatus to:
   re-encapsulate a first packet from a first service function (SF) device to obtain a second packet, wherein the first packet comprises first identification information and first service function chain (SFC) header encapsulation information, the second packet comprises first index information and the first identification information and does not comprise the first SFC header encapsulation information, and the first index information is associated with the first SFC header encapsulation information and the first identification information; and
   send the second packet to a second device based on the first SFC header encapsulation information.

16. The apparatus according to claim 15, wherein the first index information is further used to indicate that the first index information is generated by the first SFF proxy.

17. The apparatus according to claim 15, wherein the program instructions are run by the processor to further cause the apparatus to:
   receive a third packet, wherein the third packet comprises second index information and second identification information;
   when the second index information comprises first indication information and second indication information, determine that the second index information is generated by the first SFF proxy, and searching for, based on the second indication information, the first SFC header encapsulation information associated with the second indication information; and
   re-encapsulate, based on the first SFC header encapsulation information, the third packet to obtain a fourth packet, wherein the fourth packet comprises the first SFC header encapsulation information and does not comprise the first index information.

18. The apparatus according to claim 17, wherein
   the third packet is one of from the second device or forwarded by a second SFF proxy to the first SFF proxy.

19. The apparatus according to claim 17, wherein when the program instructions are run by the processor, the apparatus performs the following steps:
   before the third packet is received, receiving and caching third index information from a second SFF proxy, and third identification information and third SFC header encapsulation information that are associated with the third index information; and
   when the second index information comprised in the third packet is the same as the third index information, obtaining the third SFC header encapsulation information associated with the third index information, and re-encapsulating the third packet based on the third SFC header encapsulation information.

20. The apparatus according to claim 19, wherein when the program instructions are run by the processor, the apparatus performs the following steps:
   when it is determined, based on the second index information, that the second index information is not generated by the first SFF proxy, and no other information associated with the second index information is cached, sending the third packet to the second SFF proxy.

* * * * *